United States Patent [19]

Wiklund

[11] 3,857,425
[45] Dec. 31, 1974

[54] TREE-FELLING DEVICE
[75] Inventor: Per Martin Wiklund, Taby, Sweden
[73] Assignee: Stiftelsen Skogsmekanisering, Bromma, Sweden
[22] Filed: Sept. 10, 1973
[21] Appl. No.: 395,503

[30] Foreign Application Priority Data
Sept. 22, 1972 Sweden.............................. 12269/72

[52] U.S. Cl.................... 144/34 R, 83/490, 83/491, 144/3 D, 144/218
[51] Int. Cl.............................................. A01g 23/08
[58] Field of Search.......... 144/2 Z, 3 D, 3 R, 34 R, 144/34 A, 34 B, 309 AC, 218, 222; 83/491, 490, 835, 854

[56] References Cited
UNITED STATES PATENTS

| | | | |
|---|---|---|---|
| 3,135,304 | 6/1964 | Breer et al....................... | 83/491 X |
| 3,343,575 | 9/1967 | Trout............................... | 144/34 R |
| 3,353,430 | 11/1967 | Brackmann et al............... | 83/490 X |
| 3,364,964 | 1/1968 | Lacey............................... | 144/34 R |
| 3,461,929 | 8/1969 | Hunger et al..................... | 144/34 R |
| 3,515,190 | 6/1970 | Moriuchi.......................... | 83/490 X |
| 3,540,501 | 11/1970 | Jonsson............................ | 144/34 E |

*Primary Examiner*—Andrew R. Juhasz
*Assistant Examiner*—W. D. Bray
*Attorney, Agent, or Firm*—Young & Thompson

[57] ABSTRACT

The invention concerns a device for felling trees and/or cutting of wood with a saw-blade which is chiefly in the form of a spherical cap, or annular part thereof. The feed motion of the blade consists of a pendulous motion around the geometrical centre of the spherical cap.

6 Claims, 5 Drawing Figures

PATENTED DEC 31 1974　　　　　　　3,857,425
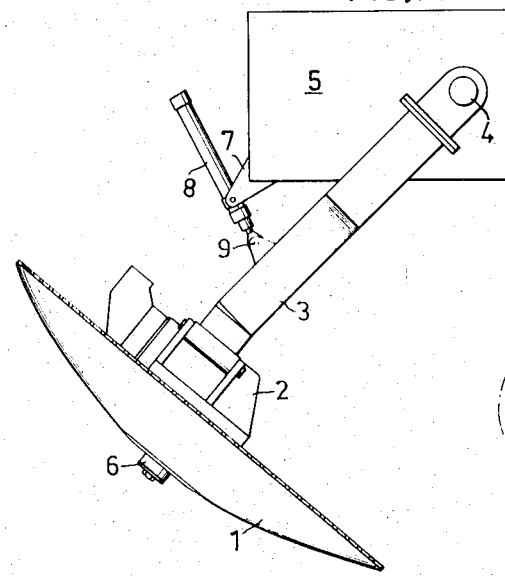
FIG. 1
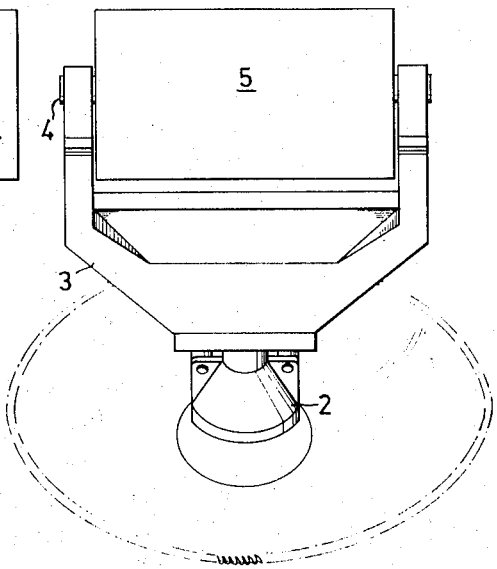
FIG. 2
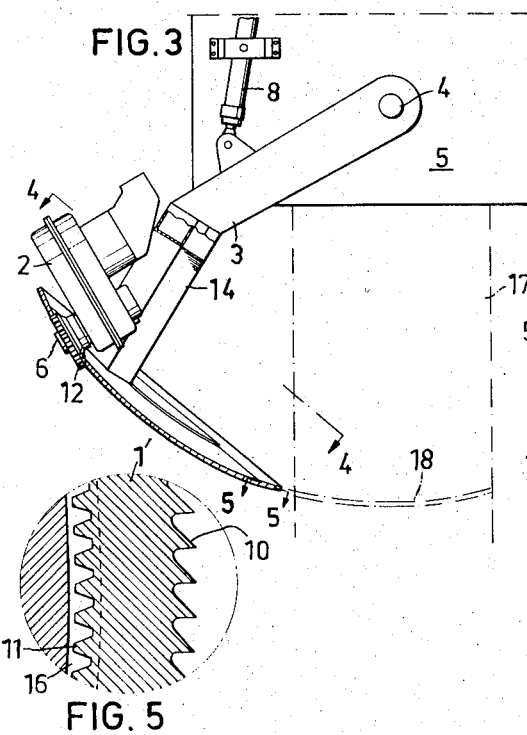
FIG. 3
FIG. 5
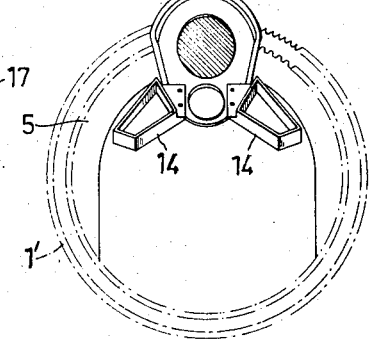
FIG. 4

TREE-FELLING DEVICE

Apparatus for felling trees by the roots or cross-cutting of timber are well-known, which operate with circular saws designed as a flat ring or flat disc. The known felling devices take up a relatively large amount of space among other things, since the flat shape of the saw-blade requires a feed motion at right angles to the tree-trunk. It is the principal object of the present invention to overcome this disadvantage and provide a light and reliable device for felling trees and/or cutting of wood.

A device according to the invention is chiefly characterized in that the saw-blade is approximately in the shape of a spherical cap or annular part thereof and that its feed motion consists of a pendulous motion around the geometrical centre of the cap. The saw-blade can be supported for its pendulous motion by a lever, link or link system, which in turn is suspended or slung on a bracket designed for attachment to the tree trunk. The saw-blade can, moreover, be fixed on an axle shaft at its centre or else, if it is annular, driven direct by the saw ring by some kind of gear or friction drive.

The greatest advantages of the present invention are the very small ground surface required by the felling device around the tree, which includes the possibility of low stump height, high machining capacity and long life, which can be obtained with the saw-blade and the possibility of using the felling device so that no damage is done to the trunk.

Two embodiments of the invention will be described with reference to the appended drawings, one relating to a felling device with the saw-blade in the form of a spherical cap, driven in the centre, and the other with the saw-blade chiefly in the form of an annular part of such a cap and driven on its inner periphery.

FIGS. 1 and 2 show the first embodiment, wherein FIG. 1 shows a vertical projection and FIG. 2 a horizontal projection of the felling device.

FIGS. 3, 4 and 5 refer to the second embodiment, whereby FIG. 3 shows a vertical projection in partial cross section, FIG. 4 a cross section along line 4—4 of FIG. 3, and FIG. 5 a cross section on a larger scale along line 5—5 of FIG. 3.

In the embodiment shown in FIGS. 1 and 2, a saw-blade 1 in the form of a spherical cap is supported by a drive unit 2 which is fixed at the lower end of a lever 3. It is fork-shaped at the top and has the shanks suspended on an axle 4 transverse thereto in a holding device 5, intended to be fixed to the trunk of the tree to be felled. The saw-blade 1 is fixed on a driving axle 6 outgoing from the drive unit 2. Said driving axle extends with its geometrical axis along a radius to the spherical cap, which radius in turn intersects the geometrical axis to the suspension axle 4. On the holding device 5 there is a projection 7 which supports in a swivelling manner a hydraulic cylinder 8 which is connected to the lever arm 3 by a pivot pin 9. The hydraulic cylinder makes possible the automatic pendulous motion of the saw-blade around the axle 4. During this pendulous motion the spherical cap is moved along the sphere of which geometrically speaking it forms a part.

The detailed formation of the holding device 5 is unimportant in this connection, but the device should be so designed that it can grip around and hold the arrangement firmly on a tree-trunk while the felling or cutting into lengths is in progress. It must also be so designed that it can be arranged on or in a simple way connected to a lifting device which lifts the tree off the stump after the saw-blade has worked through the trunk. In the felling, the holding device is arranged on the trunk in such a way that the bottom point of the periphery of the saw-blade reaches to the very bottom of the trunk, i.e., where the saw-cut is to begin. The drive unit 2 is started so that the saw-blade is rotated at the necessary speed by the drive axle 6. The saw-blade is then fed by swinging lever arm 3 by means of hydraulic cylinder 8 around the axle 4 so that the saw-blade is introduced into the trunk and cuts it. The saw-cut is a concave surface corresponding to the cap-shape of the saw-blade.

In the embodiment shown in FIGS. 1 and 2 with the saw-blade driven by a central driving axle, the effective feed motion is limited in extent to the difference between the radius of the saw-blade and the radial spread of the drive unit, i.e., trees of a larger diameter than said difference cannot be cut will felling devices of this type.

However, larger trees can be cut by means of felling devices of the type shown in FIGS. 3–5. In this case, the saw-blade is in the form of an annular part 1' of a spherical cap with the saw teeth 10 on the outer periphery of the ring and cogs 11 on its inner periphery, whereby the axle 6 of the drive unit 2 is provided with a cogwheel 12 for engagement with the cogs 11. If necessary the drive can be distributed on several cogwheels. The lever arm 3 is developed at the bottom with a pair of supports 14, which in turn support the drive unit and a U-shaped guide 15 which like the (in this case stationary) cap is extended on its periphery with guide grooves 16 in which the saw ring runs. The drive unit is situated at one edge of the saw-ring while the saw-ring on the diametrically opposite position is guided by the cap 1, which during the sawing process goes into the saw-groove. The parts supported by the lever arm 3 can be swung around a suspension axle 4 on a holder 5 by means of hydraulic cylinder 8 as in the previous embodiment.

FIG. 3 shows the holding device fixed on a tree trunk 17 and the saw-blade is in the starting position for felling. The prospective saw-cut is marked by a dash-dotted line 18. This constitutes an arc with the centre of axle 4 as its centre.

The embodiment of FIGS. 3–5 has the advantage over those already described that it has no limit in the centre so that the saw-blade can be fed in so far across the tree trunk that the saw-cut extends over the centre of the saw-blade. It is therefore possible to cut the trees with a diameter of about 65 percent of the outer diameter of the saw ring, so that the felling device covers very little ground surface around the tree in felling. This felling device also has the advantage over that first described that the gyroscopic forces arising in the saw-blade are much easier to control.

In the foregoing the saw ring has been indicated as part of a spherical cap. In practice it can be designed as a truncated cone which as far as possible follows the form of a cap. The sawing operates also if the ring is made relatively small and the saw-teeth set or upset to achieve clearance in the saw-cut.

The feed motion can be produced, instead of by the lever arm 3, by a link mechanism which imparts the corresponding motion to the saw-blade.

Both embodiments can be modified so that the centre axle for the pendulous motion of the saw-blade can be swung in different planes, which pass through the geometrical centre of the tool. If the swinging of the centre axle takes place in the horizontal plane, it is possible to choose the best line of attack for felling the tree with respect to terrain obstacles and neighbouring trees. In some embodiments this pendulous motion also makes it possible to fell larger trees than the tool could otherwise manage. The swinging of the centre axle in the vertical plane may be an advantage, for example, when feeling crooked trees. The possibility of a pendulous motion of the centre axle can be obtained, for example, by providing the link mechanism which imparts the feed motion to the saw-blade with a cardanic suspension or suspension in a roller path.

What I claim is:

1. Apparatus for felling trees and/or cutting wood with a saw blade, comprising a concave saw blade having a circular series of saw teeth about the periphery thereof, means mounting said saw blade for pendulous motion around the centroid of said concave blade, and means for rotating said saw blade about an axis passing through said centeroid.

2. Apparatus as claimed in claim 1, and a holder adapted to be fixed upon a tree trunk, said pendulous mounting means comprising a linkage suspending said blade from said holder.

3. Apparatus as claimed in claim 1, and a driving axle at the center of said saw blade on which said saw blade is mounted for rotation.

4. Apparatus as claimed in claim 1, said saw blade comprising an annular portion of a spherical cap.

5. Apparatus as claimed in claim 4, said saw teeth being on the outer periphery of said annular portion, and gear teeth on the inner periphery of said annular portion, and a driven gear engaged with said gear teeth.

6. Apparatus as claimed in claim 1, said mounting means being offset to one side of said blade.

* * * * *